United States Patent [19]

Wissbrun

[11] 3,821,160

[45] June 28, 1974

[54] STRESS-CRACK RESISTANT POLYHYDROXY-ETHER POLYMERS

[75] Inventor: Kurt F. Wissbrun, Short Hills, N.J.

[73] Assignee: Celanese Corporation, New York, N.Y.

[22] Filed: Jan. 26, 1973

[21] Appl. No.: 327,049

[52] U.S. Cl.... 260/45.7 S, 260/45.7 R, 260/45.9 R, 260/47 EP
[51] Int. Cl............................................. C08d 11/04
[58] Field of Search...... 260/45.9 R, 45.7 S, 45.7 R, 260/47 EP

[56] References Cited

UNITED STATES PATENTS 3,269,979 8/1966 Snedeker ........................ 260/47 EP
3,324,073 6/1967 Potter et al. .................... 260/47 EP

*Primary Examiner*—Melvyn I. Marquis

[57] ABSTRACT

Polyhydroxy-ethers having improved stress-crack resistance properties are prepared by dissolving in the polymer a soluble inorganic salt.

9 Claims, No Drawings

STRESS-CRACK RESISTANT POLYHYDROXY-ETHER POLYMERS

BACKGROUND OF INVENTION

Thermoplastic polyhydroxy-ethers have many physical properties advantageous in container applications such as transparency, toughness, high tensile strength, and outstanding gas impermeability. Significantly, thermoplastic polyhydroxyethers in addition to being tough, are relatively easily formable by any of the conventional thermoplastic fabricating techniques, including cold forming, blow molding, extruding, compression molding and other methods known in the plastics art.

In container applications, including conventional packaging, such as wrapping film and bottles, as well as piping, cable jacketing, and wire insulation, a thermoplastic material must be capable of resisting attack by common chemicals found in the environment and of course, the substance being contained.

Unfortunately, thermoplastic polyhydroxy-ethers share the shortcoming of many other thermoplastic polymers, such as styrene polymers, in exhibiting lower stress crack resistance upon exposure to packaged materials and solvents.

It is, therefore, an object of the present invention to impart enhanced resistance to stress-cracking upon exposure of thermoplastic polyhydroxy-ethers to chemically active environments.

SUMMARY OF INVENTION

It has now been discovered that dissolution in a thermoplastic polyhydroxy-ether polymer of up to about 25 percent by weight, preferably about 5 to 15, of a simple, essentially inorganic salt greatly increases the environmental stress-crack resistance of thermoplastic polyhydroxy-ethers while at the same time enabling these polymers to retain their desirable properties including clarity. In addition, the incorporation of this salt increases glass transition temperatures, melt viscosities, heat distortion temperatures, and solvent resistance.

DETAILED DESCRIPTION OF INVENTION

The term "thermoplastic polyhydroxy-ether" herein refers to substantially linear polymers having the general formula:

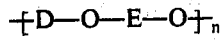

wherein D is the radical residuum of a dihydric phenol, E is an hydroxyl containing radical residuum of an epoxide, and n represents the degree of polymerization and is at least 30 and is preferably 80 or more. The term "thermoplastic polyhydroxy-ether" is intended to include mixtures of at least two thermoplastic polyhydroxy-ethers.

The thermoplastic polyhydroxy-ethers can be prepared by admixing from about 0.985 to about 1.015 moles of an epihalohydrin with one mole of a hydric phenol together with from about 0.6 to 1.5 moles of an alkali metal hydroxide, such as, sodium hydroxide or potassium hydroxide generally in an aqueous medium at a temperature of about 10° to about 50°C. until at least about 60 mole percent of the epihalohydrin has been consumed. The thermoplastic polyhydroxy-ethers thus produced have reduced viscosities of at least 0.43.

Reduced viscosity values are computed by use of the equation:

$$\text{Reduced viscosity} = t_s - t_o/ct_o$$

wherein $t_o$ is the efflux time of the solvent (tetrahydrofuran), $t_s$ is the efflux time of the poly (hydroxyether) solution, and c is the concentration of the polyhydroxyether solution in terms of grams of polyhydroxyether per 100 ml. of tetrahydrofuran.

The dihydric phenol contributing the phenol radical residuum, D, can be either a dihydric mononuclear phenol such as those having the general formula:

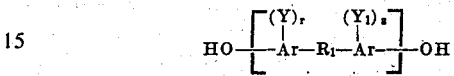

wherein Ar is an aromatic divalent hydrocarbon such as napthylene, and preferably, phenylene, Y and $Y_1$ which can be the same or different are alkyl radicals, preferably having from one to four carbon atoms, halogen atoms, i.e., fluorine, chlorine, bromine, and iodine, or alkoxy radicals, preferably having from one to four carbon atoms, r and z are integers, having a value from 0 to a maximum value corresponding to the number of hydrogen atoms on the aromatic radical (Ar) which can be replaced by substituents and $R^1$ is a bond between adjacent carbon atoms as in dihydroxydiphenyl or a divalent radical including, for example,

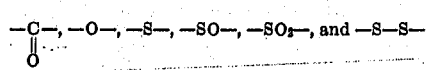

and divalent hydrocarbon radicals, such as alkylene, alkylidene, cycloaliphatic, e.g., cycloalkylene and cycloalkylidene, halogenated alkoxy or aryloxy substituted alkylene, alkylidene and cycloaliphatic radicals as well as alkarylene and aromatic radicals including halogenated alkyl, alkoxy or aryloxy substituted aromatic radicals and a ring fused to an Ar group; or $R_1$ can be polyalkoxy, or polysiloxy, or two or more alkylidene radicals separated by an aromatic ring, a tertiary amino group, an ether linkage, a carbonyl group or a sulfur containing group such as sulfoxide, and the like.

Examples of specific dihydric polynuclear phenols include among others:

The bis(hydroxyphenyl) alkanes such as 2,2-bis(4-hydroxyphenyl) propane, 2,4'-dihydroxydiphenylmethane, bis(2-hydroxyphenyl) methane, bis(4-hydroxyphenyl) methane, bis(4-hydroxy-2,6-dimethyl-3-methoxyphenyl) methane, 1,1-bis(4-hydroxyphenyl) ethane, 1,2-bis(4-hydroxyphenyl) ethane, 1,1-bis(4-hydroxy-2-chlorophenyl) ethane, 1,1-bis(3-methyl-4-hydroxyphenyl) ethane, 1,3-bis(3-methyl-4-hydroxyphenyl) propane, 2,2-bis(3-phenyl-4-hydroxylphenyl) propane, 2,2-bis(3-isopropyl-4-hydroxyphenyl) propane, 2,2-bis(2-isopropyl-4-hydroxyphenyl) propane, 2,2-bis(4-hydroxynapthyl) propane, 2,2-bis(4-hydroxyphenyl) pentane, 3,3-bis(4-hydroxyphenyl) pentane, 2,2-bis(4-hydroxyphenyl) heptane, bis(4-hydroxyphenyl) phenylmethane, bis(4-hydroxyphenyl) cyclohexylmethane, 1,2-bis(r-hydroxyphenyl-1,2-bis[phenyl]) propane, 2,2-bis(4-hydroxyphenyl)1-phenyl-propane and the like;

Di(hydroxyphenyl) sulfones such as bis(4-hydroxyphenol) sulfone, 2,4'-dihydroxydiphenyl sulfone, 5'-chloro-2,4'-dihydroxyldiphenyl sulfone, 5'-chloro-4,4'-dihydroxydiphenyl sulfone and the like;

Di(hydroxyphenyl) ethers such as bis(4-hydroxyphenyl) ether, the 4,3', 4,2'-, 2,2'-, 2,3'-, dihydroxydiphenyl ethers, 4,4'-dihydroxy-2,6-dimethyldiphenyl ether, bis (4-hydroxy-3-isobutylphenyl) ether, bis(4-hydroxy-3-isopropylphenyl) ether, bis(4-hydroxy-3-chlorophenyl) ether, bis(4-hydroxy-3-fluorophenyl) ether bis(4-hydroxy-3-bromophenyl) ether, bis(4-hydroxynaphthyl) ether, bis(4-hydroxy-3-chloronaphthyl) ether, bis(2-hydroxydiphenyl) ether, 4,4'dihydroxy-2,6-dimethoxydiphenyl ether, 4,4'-dihyroxy-2,5-diethoxydiphenyl ether, and the like;

Also suitable are the bisphenol reaction products of 4-vinylcyclohexene and phenols, e.g., 1,3-bis(p-hydroxyphenyl)-1-ethylcyclohexane, and the bisphenol reaction products of dipentene or its isomers and phenols such as 1,2-bis (p-hydroxyphenyl)-1-methyl-4-isopropylcyclohexane as well as bisphenols such as 1,3,3,-trimethyl-1-(4-hydroxyphenyl)-6-hydroxyindane, and 2,4-bis(4-hydroxyphenyl)-4-methylpentane, and the like.

Particularly desirable dihydric polynuclear phenols have the formula:

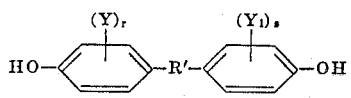

wherein Y and $Y_1$ are as previously defined, r and z have values from 0 to 4 inclusive, and $R^1$ is a divalent saturated aliphatic hydrocarbon radical, particularly alkylene and alkylidene radicals having from one to three carbon atoms, and cycloalkylene radicals having up to and including 10 carbon atoms.

Mixtures of dihydric phenols can also be employed and whenever the term "dihydric phenol" or "dihydric polynuclear phenol" is used herein, mixtures of these compounds are intended to be included.

The epoxide contributing the hydroxyl containing radical residuum, E, can be a monoepoxide or diepoxide. By "epoxide" is meant a compound containing an oxirane group, i.e., oxygen bonded to two vicinal aliphatic carbon atoms, thus

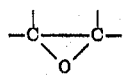

A monoepoxide contains one such oxirane group and provides a radical residuum E containing a single hydroxyl group, a diepoxide contains two such oxirane groups and provides a radical residuum E containing two hydroxyl groups. Saturated epoxides, by which term is meant diepoxides free of ethylenic unsaturation, i.e.,

and acetylenic unsaturation, i.e., —C ≡ C, are preferred. Particularly preferred are halogen substituted saturated monoepoxides, i.e., the epihalohydrins and saturated monoepoxides, i.e., the epihalohydrins and saturated diepoxides which contain solely carbon, hydrogen and oxygen, especially those wherein the vicinal or adjacent carbon atoms form a part of an aliphatic hydrocarbon chain. Oxygen in such diepoxides can be, in addition to oxirane oxygen, ether oxygen —O—, oxacarbonyl oxygen

carbonyl oxygen,

and the like.

Specific examples of monoepoxides, include epichlorohydrins such as epichlorohydrin, epibromohydrin, 1,2-epoxy-1-methyl-3-chloropropane, 1,2-epoxy-1-butyl-3-chloropropane, 1,2-epoxy-2-methyl-3-fluropropane, and the like.

Illustrative diepoxides include diethyl glycol bis-(3,4-epoxycyclohexane-carboxylate), bis-3,4-epoxycyclohexylmethyl) adipate, bis(3,4-epoxycyclohexylmethyl) phthalate, 6-methyl, 3,4-epoxycyclohexyl-6-methyl-3,4-epoxycyclohexane carboxylate, 2-chloro-3,4-epoxycyclohexylmethyl-2-chloro-3,4-epoxycyclohexane carboxylate, diglycidal ether, bis(2,3-epoxycyclopentyl) ether, 1,5-pentanediol bis(-6-methyl-3,4-epoxycyclohexylmethyl) ether, bis(2,3-epoxy-2-ethylhexyl) adipate, diglycidyl maleate, diglycidyl phthalate, 3-oxatetracyclo(4.4.0.1$^{7,10}$,0$^{2,4}$)-undec-8-yl 2,3-epoxypropyl ether, bis(2,3-epoxycyclopentyl) sulfone, bis(3,4-epoxyhexoxyporpyl) sulfone, 2,2-sulfonyldiethyl bis(2,3-epoxycyclopentane carboxylate), 3-oxatetracyclo (4.4.0$^{7,10}$,0$^{2,4}$) undec-8-yl 2,3-epoxybutyrate, 4-pentenal-di-(6-methyl-3,4-epoxycyclohexylmethyl) acetal, ethylene glycol bis (9,10-epoxystearate), diglycidyl carbonate, bis(2,3-epoxybutylphenyl)-2-ethylhexyl phosphate, diepoxydioxane, butadienedioxide, and 2,3-dimethyl butadiene dioxide. The preferred diepoxides are those wherein each of the oxirane groups is connected to an electron donating substituent which is not immediately connected to the carbon atoms of that oxirane group. Such diepoxides having the grouping $$-A-\overset{|}{C}-\overset{|}{C}\underset{O}{\diagdown\diagup}\overset{|}{C}-$$

wherein A is an electron donating substituent such as $$-O-, -\underset{Q}{N}-, -S-, -S-O-, -SO_2-, -\overset{O}{\overset{\|}{C}}-O- \text{ or } \underset{Q}{S}O_2$$

and Q is a saturated hydrocarbon radical such as an alkyl, cycloalkyl, aryl or aralkyl radical.

The salts which may be utilized in the instant invention are simple in character, i.e., not polymeric salts, but rather salts of monomeric materials having a relatively small number of atomic constituents. Furthermore, they are essentially inorganic in nature, i.e., not containing more than about 5 carbon atoms per ion. Preferably, furthermore, they are formed from cations which are derived from alkaline or alkaline earth metals.

In order to determine whether or not a particular salt is soluble in the polyhydroxyether compositions of this invention, it is simply necessary to dissolve the salt in the polymeric material and determine whether the resulting solution is clear or cloudy. If it is cloudy, then the salt will be said to be insoluble for purposes of the instant invention.

Carbide Corporation under the trade name of Bakelite PRDA-8060. Various blends of this material were prepared with a calcium thiocyanate salt, by heating the phenoxy material to its melting point and slowly adding the desired amount of the salt with mixing. The tests listed in Table I were performed with the results as shown.

Table I

Properties of Phenoxy - Ca(SCN)$_2$ Compositions

| | | | |
|---|---|---|---|
| Parts Ca(SCN)$_2$/100 parts Phenoxy | 0 | 5 | 15 |
| ESC (% critical strain) in Iso- | | | |
| propyl alcohol | 0.13 | 0.12 | 1.2 |
| in n-Hexane | 0.70 | 0.75 | 0.50 |
| Heat Distortion Tem. (66 psi) | 88°C. | 103°C. | 106°C. |
| Vicat Softening Temp. | 99 | 115 | 136 |
| Rockwell Hardness (M) | 40 | 61 | 70 |
| Flexural Modulus (psi × 10$^5$) | 3.9 | 4.3 | 4.1 |
| TG (°C) | 97 | 116 | 148 (estimated) |
| Plastograph Torque (kg. m) | 2.0 | 3.4 | 4.1 |
| Melt Viscosity (poise) | | | |
| (at 1 sec$^{-1}$, 190°C) | 3.4×10$^5$ | 1.2×10$^6$ | 3.4×10$^6$ |
| Solubility in methylene | | | |
| chloride | Soluble | — | Insoluble (Spl. Contained 20 parts salt) |
| Volume Resistivity | 4.6×10$^{13}$ | 1.0×10$^{12}$ | 3.5×10$^{10}$ |
| Surface Resistivity | 1.3×10$^{15}$ | 2.0×10$^{13}$ | 1.1×10$^{10}$ |

In addition, of course, it is a further requirement of the inorganic salts of the instant invention that they be nonreactive with the polyhydroxyether compositions.

Examples of the inorganic salts which are generally utilizable in the instant invention include magnesium thiocyanate, lithium thiocyanate, lithium iodide, calcium bromide, magnesium bromide, and lithium bromide.

In preparing materials having the improved properties of the instant invention, the polyhydroxyether polymer which is being utilized is melted (or dissolved in a solvent common to the polymer and salt) and with high speed stirring or mixing the desired amount of the inorganic salt is introduced into the melt or dope. The solution should rapidly become clear. The resulting melt may then be cooled and pulverized or pelletized or it may immediately be formed into particular cast end product; or the solvent may be removed from the dope by evaporation.

In addition to forming cast products to molded products from the dope containing the inorganic salt of the instant invention, it is possible to prepare films. These films, in addition to the previously enumerated improved properties, have significantly increased moisture absorption and water vapor transmission rates, which make them increasingly useful in medical and other body contact applications.

In the examples which follow all parts and percentages are by weight unless otherwise specified.

EXAMPLES I

In the instant example and all following examples, a high molecular weight phenoxy resin (approximately 30,000) prepared by reacting bisphenole-A and epichlorohydrin having the following repeating unit

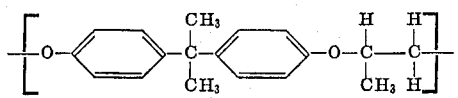

was utilized. This material was obtained from Union

In the above table the following ASTM test were utilized:

| | |
|---|---|
| Heat Distortion Temperature | D 648 |
| Vicat Softening Temperature | D 1525 |
| Rockwell Hardness | D 785 |
| Flexural Tests | D 790 |
| Resistivities | D 257 |

The Plastograph torque value was obtained based upon the methods of Goodrich and Porter, as described in *Polymer and Engineering Science*, January 1967, pg. 45.

As can be seen from the above table the addition of up to about 15 parts per 100 calcium thiocyanate into the phenoxy polymers of the instant invention greatly increased the heat distortion temperature, softening temperature, hardness and alcohol stress crack resistance of these polymers. Furthermore, the resulting polymer is virtually insoluble in methylene chloride.

EXAMPLE II

In order to quickly demonstrate the salts which are capable of producing the improved properties of the instant invention when dissolved in the described phenoxy polymers, a Plastograph test was run. In this test the various salts to be evaluated were added to a melt of the polymer in the Plastograph. At the end of five minutes the percent increase or decrease in the torque of the melt was determined. It was discovered when salts increased the torque above about 15 or 20 percent, the physical properties of their cast films and the resulting plastic properties of the modified melt were significantly improved compared to unmodified polymer systems. Where, on the other hand, small increases in the torque or decreases in the torque were observed, and where the appearance of the film was opaque, no such improved properties were evident.

TABLE II

PLASTOGRAPH BLENDS OF VARIOUS SALTS WITH PHENOXY

| Salt | Torque Change (5 min.) | Appearance of Film | $T_g$ (°C.) |
|---|---|---|---|
| none | — | Clear | 95 |
| $M_g(SCN)_2$ | +95 | Clear | 130 |
| LiSCN | +67 | Clear | 117 |
| KSCN | 0 | Opaque | 98 |
| $MgI_2$ | $-12^{(b)}$ | Clear | (a) |
| LiI | +90 | Clear | 136 |
| KI | +8 | Clear (?) Bubbly | (a) |
| $CaBr_2$ | +61 | Clear | (a) |
| $M_gBr_2$ | $+54^{(b)}$ | Clear | (a) |
| LiBr | +98 | Clear | 122 |
| $CaCl_2$ | +13.0 | Opaque | (a) |
| $M_gCl_2$ | $-14$ | Opaque | (a) |
| LiCl | +5 | Cloudy | 99 |

$^{(a)}$Not measured on dried film.
$^{(b)}$Torque not steady. Usually decrease after initial increase, suggesting decomposition.

Thus, Table II shows the exceptional properties of magnesium thiocyanate, lithium thiocyanate, calcium bromide, magnesium bromide and lithium bromide. The other tested salts exhibited no improvements to stress crack resistance of the resulting polymer blends.

Although the invention has been described with particularity in its preferred forms, it is understood that the present disclosure has been made only by way of example and that numerous changes may be resorted to without departing from the scope and spirit of the invention.

What is claimed is:

1. A transparent stress crack resistant thermoplastic polyhydroxyether composition comprising:

A. a thermoplastic polyether having the general formula

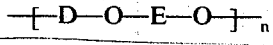

wherein D is the radical residuum of a dihydric phenol, E is a radical residuum of an epoxide and $n$ is an integer which represents the degree of polymerization and is at least 30; and B. a simple essentially inorganic, soluble salt containing not more than about 5 carbon atoms per ion which salt is non-reactive with the thermoplastic polyether, said salt being present in a concentration of up to about 25 percent based on the weight of the total system.

2. The composition of claim 1 wherein the salt is alkaline or alkaline-earth salt.

3. The composition of claim 1 wherein the dihydric phenol is a bis(4-hydroxyphenyl) alkane and $n$ is at least 80.

4. The composition of claim 1 wherein the epoxide is an epihalohydrin and $n$ is at least 80.

5. The composition of claim 1 wherein the salt is selected from the group consisting of calcium thiocyanate, magnesium thiocyanate, lithium thiocyanate, calcium bromide, magnesium bromide, and lithium bromide.

6. The composition of claim 1 wherein the salt is calcium thiocyanate.

7. The composition of claim 1 wherein the salt is lithium bromide.

8. Shaped articles fabricated from the composition of claim 1.

9. A film fabricated from the composition of claim 1.

* * * * *